United States Patent [19]
Kuwajima et al.

[11] Patent Number: 5,792,548
[45] Date of Patent: Aug. 11, 1998

[54] MAGNETIC RECORDING MEDIUM HAVING A MAGNETIC LAYER AND AN INTERMEDIATE LAYER OF SPECIFIED COMPOSITION

[75] Inventors: Takayoshi Kuwajima; Tsunehiko Ikarashi; Yuko Motegi, all of Nagano, Japan

[73] Assignee: TDK Corporation, Tokyo, Japan

[21] Appl. No.: 610,094

[22] Filed: Feb. 29, 1996

[30] Foreign Application Priority Data

Mar. 3, 1995 [JP] Japan .................. 7-044192

[51] Int. Cl.$^6$ .................................................. G11B 5/704
[52] U.S. Cl. ............... 428/215; 428/323; 428/328; 428/329; 428/336; 428/694 BS; 428/900
[58] Field of Search .................... 428/215, 323, 428/694 BS, 900, 328, 329, 336

[56] References Cited

U.S. PATENT DOCUMENTS

| | | | |
|---|---|---|---|
| 4,963,433 | 10/1990 | Ogawa et al. | 428/323 |
| 5,258,223 | 11/1993 | Inaba et al. | 428/323 |
| 5,389,418 | 2/1995 | Ota et al. | 428/64 |
| 5,455,112 | 10/1995 | Inaba et al. | 428/323 |
| 5,458,948 | 10/1995 | Yanagita et al. | 428/141 |
| 5,512,363 | 4/1996 | Goto et al. | 428/323 |

FOREIGN PATENT DOCUMENTS

| | | |
|---|---|---|
| 152 058 A1 | 8/1985 | European Pat. Off. |
| 520 155 A2 | 12/1992 | European Pat. Off. |
| 623 918 A1 | 11/1994 | European Pat. Off. |
| 5-242455 | 8/1982 | Japan |
| 57-198536 | 12/1982 | Japan |
| 60-035323 | 2/1985 | Japan |
| 60-164926 | 8/1985 | Japan |
| 62-154225 | 7/1987 | Japan |
| 63-191315 | 8/1988 | Japan |
| 1-094523 | 4/1989 | Japan |
| 1-213822 | 8/1989 | Japan |
| 1-300419 | 12/1989 | Japan |
| 5-073883 | 3/1993 | Japan |
| 5-059490 | 8/1993 | Japan |
| 5-059491 | 8/1993 | Japan |
| 5-217149 | 8/1993 | Japan |
| 6-111280 | 4/1994 | Japan |

*Primary Examiner*—Stevan A. Resan
*Attorney, Agent, or Firm*—Stephen F. K. Yee

[57] ABSTRACT

A magnetic recording medium having an intermediate layer excellent in conductivity, surface properties and strength, and excellent in electromagnetic characteristics, physical properties, etc., which comprises a non-magnetic intermediate layer having a thickness of 0.5 μm to 3.0 μm formed on at least one surface of a non-magnetic support, and a magnetic layer formed on the intermediate layer, the magnetic layer being mainly composed of a ferromagnetic powder and a binder and having a thickness of 0.1 μm to 0.5 μm, in which said magnetic layer is formed on the intermediate layer at least in a dry state, and the intermediate layer comprises (A) an inorganic material having an average particle size of 10 nm to 50 nm and a Mohs' hardness of 7 or less, (B) an inorganic material having an average particle size of 100 nm to 500 nm and a Mohs' hardness of 9 or more, (C) carbon black, a lubricant and a binder.

2 Claims, No Drawings

MAGNETIC RECORDING MEDIUM HAVING A MAGNETIC LAYER AND AN INTERMEDIATE LAYER OF SPECIFIED COMPOSITION

BACKGROUND OF THE INVENTION

The present invention relates to a magnetic recording medium, and particularly to a high density magnetic recording medium having an intermediate layer and a magnetic layer with a thickness of 0.1 μm to 0.5 μm, in which magnetic layer is formed by a sequential (one by one) coating system (so-called wet-on-dry coating system), and said magnetic recording medium has a low surface roughness and excellent reliability, overwrite characteristics and electromagnetic characteristics.

With the recent progress of high density recording in magnetic recording media, systems using short recording wavelengths have been particularly extensively developed. For example, the shortest recording wavelength of Hi8 video format is about 0.5 μm. In such systems using short recording wavelengths, the use of the conventional media having a magnetic layer thickness of about 1 μm to 5 μm raises the serious problems of the thickness loss in recording and reproducing, a decrease in output due to self-demagnetization, and a reduction in resolution. In particular, for digital recording, recording systems in which new signals are overwritten on original signals are employed mainly as systems for civil use. With a further recent increase in recording density, it has been urgently required not only to shorten recording wavelengths, but also to improve overwrite characteristics and resolution, in order to sufficiently overwrite recording signals having a plurality of wavelengths such as 2:7 in frequency ratio, for example, Run Length Limited (RLL) signals. However, the conventional coating type magnetic recording media are only improved in electromagnetic characteristics (such as magnetic flux density and coercive force) and surface properties of the magnetic layers, which do not meet the above-mentioned requirements.

As an effective measure to decrease such a reduction in resolution and the thickness loss, to reduce self-demagnetization to increase the output, and to improve the overwrite characteristics, coating type magnetic recording media are reported in literatures. Japanese Patent Unexamined Publication No. 57-198536, Japanese Patent Unexamined Publication No. 62-154225, etc., in which magnetic powders high in saturation magnetization amount, such as metal magnetic powders, are used to keep the residual magnetic flux density at a predetermined level or more, thereby decreasing the magnetic layer to a very thin thickness of 2 μm or less, or 1 μm or less.

However, when the magnetic layer is directly formed on non-magnetic support, the thin magnetic layer is affected easily by adverse effects caused by a surface of the non-magnetic support. Specifically, a magnetic layer thickness of 1 μm or less reproduces the rough surface of the non-magnetic support on the surface of the magnetic layer, resulting in deterioration of head touch and particularly in a decrease in short wavelength region output.

On the other hand, the magnetic layer usually contains various additives, such as reinforcing materials for enhancing the mechanical strength of the surface of the magnetic layer (for example, particles higher in hardness and larger in size than ferromagnetic powders, such as α-alumina), conductive materials for inhibiting dropouts and adhesion of dust (for example, conductive carbon black having a large specific surface area) and lubricants for increasing the reliability (for example, fatty acids and fatty acid esters), in addition to ferromagnetic powders and binders. However, a magnetic layer thickness of 1 μm or less decreases the absolute amounts of additives contained to cause difficulty of exhibiting their effects, compared with media having a magnetic layer thickness exceeding 1 μm, resulting in deterioration of the physical reliability of media. On the other hand, if the amounts of additives are increased until their effects are exhibited, the content of ferromagnetic powders is relatively decreased, which reduces the magnetic flux density of the magnetic layer, causing a decrease in recording density.

As a measure for solving these problems, it has been known to provide an intermediate layer (including an underlayer and an undercoat layer) having specific functions between the magnetic layer and the support.

For example, Japanese Patent Unexamined Publication Nos. 60-35323 and 60-164926 (EPA 152,058) disclose formation of an intermediate layer mainly composed of carbon black, binders and optional lubricants. These patent publications describe that the adhesion between the magnetic layer and the support, the conductivity of the surface of the magnetic layer and the high reliability of the media can be obtained by decreasing the amounts of additives such as binders, lubricants and conductive carbon black contained in the magnetic layer to increase the ratio of the ferromagnetic powders contained in the magnetic layer with an increase in recording density, and alternatively by forming the intermediate layer having functions thereof.

Japanese Patent Unexamined Publication Nos. 1-94523, 1-213822, 1-300419 and 63-191315 (U.S. Pat. No. 4,963,433) show formation of intermediate layer mainly composed of non-magnetic inorganic materials such as titanium oxide and α-iron oxide, and carbon black, and containing lubricants if necessary. Japanese Patent Unexamined Publication No. 1-300419 describes that functions such as conductivity are given to the intermediate layer and the intermediate layer is mainly composed of the non-magnetic inorganic materials having good dispersibility, whereby the intermediate layer can have good surface roughness to improve the surface properties of the magnetic layer formed thereon.

Further, Japanese Patent Unexamined Publication No. 5-242455 discloses "a magnetic recording medium comprising a non-magnetic support, and a soft magnetic layer (high permeability layer) or a non-magnetic layer and a magnetic layer formed thereon in this order, wherein said soft magnetic layer or said non-magnetic layer contains at least one kind of fine powder selected from the group consisting of oxides, carbides and nitrides having a larger average particle size than a soft magnetic powder contained in said soft magnetic layer or a non-magnetic powder contained in said non-magnetic layer and having a new Mohs' hardness of 6 or more, in an amount of 2 to 20% by weight based on said soft magnetic powder or said non-magnetic powder". It also discloses that preferred examples of the non-magnetic powders used in said nonmagnetic layer include inorganic powders such as carbon black, $CaCO_3$, titanium oxide, barium sulfate, γ-iron oxide, α-$Al_2O_3$ and α-iron oxide, and that examples of the oxides, carbides and nitrides having a new Mohs' hardness of 6 or more include $Al_2O_3$, $Cr_2O_3$, α-$Fe_2O_3$, $ZrO_2$, titanium oxide, silicon carbide, boron carbide, silicon nitride, boron nitride and titanium nitride. Furthermore, U.S. Pat. No. 5,455,112 (Japanese Patent Unexamined Publication No. 5-217149) describes "(1) a magnetic recording medium comprising a lower non-magnetic layer formed on a non-magnetic support, said lower non-magnetic layer containing non-magnetic powders dispersed in a binder, and an upper magnetic layer further formed thereon while said lower non-magnetic layer is in a wet state, said upper magnetic layer containing ferromagnetic powders dispersed in a binder, wherein said upper magnetic layer has an average thickness of 1.0 µm or less, and the non-magnetic powders contained in said lower non-magnetic layer comprise (A) a granular inorganic powder having an average particle size of 10 nm to 80 nm, (B) carbon black having an average particle size of 10 nm to 40 nm and (C) a third component larger in size than said granular inorganic powder (A) and carbon black (B); (5) the magnetic recording medium described in (1), wherein the volume ratios of the three kinds of powders (A), (B) and (C) are (A): 40% to 80%, (B): 15% to 40% and (C): 2% to 26%; and (6) the magnetic recording medium described in (1), wherein (A) contained in said lower non-magnetic layer is one member selected from the group consisting of titanium oxide, barium sulfide, silica, alumina, zinc oxide and α-iron oxide." It also describes that preferred examples of the powders (C) include α-alumina having an α conversion rate of 90% or more, β-alumina, γ-alumina, α-iron oxide, $TiO_2$ (rutile and anatase), $CeO_2$, $SnO_2$, $ZnO$, $ZrO_2$, $SiC$, $TiC$, $SiO_2$, $Cr_2O_3$, $BN$, $MoS_2$ and $WO_2$. These magnetic recording media described in Japanese Patent Unexamined Publication Nos. 5-217149 (U.S. Pat. No. 5,455,112) and 5-242455 are produced by the so-called wet-on-wet system, in which both the intermediate layer and the magnetic layer are formed in a wet state. This system is described in detail in Japanese Patent Examined Publication Nos. 5-59490 and 5-59491, Japanese Patent Unexamined Publication No. 5-73883 (EPA 520,155), etc. It is reported that the wet-on-wet system makes it possible to relatively easily form coated layer having a thickness of 1 µm or less, compared with the conventional one by one (wet-on-dry) coating system, and particularly, the surface properties thereof are good.

However, in the case of the intermediate layer mainly composed of carbon black and binder which are represented by Japanese Patent Unexamined Publication Nos. 60-35323 and 60-164926 (EPA 152,058), it is difficult to uniformly disperse conductive carbon black in the binder because of specific surface area and oil absorption characteristics of the conductive carbon black. Further, the coating liquid prepared have high thixotropic viscoelasticity induced by the structure of carbon black contained therein, which influences the leveling and smoothing of coated surface, resulting in a tendency to cause roughened surface of the intermediate layer. However, if the coating liquids are diluted with large amounts of organic solvents to inhibit the thixotropy, voids are formed by evaporation of the organic solvents in coating, which is liable to roughen the surface of the intermediate layer.

Further, in the case of the intermediate layer mainly composed of carbon black and the non-magnetic inorganic materials represented by titanium oxide and α-iron oxide, which are described in Japanese Patent Unexamined Publication Nos. 1-94523, 1-213822, 1-300419, etc., small scratches produced by rubbing with guide rolls or nip rolls in delivery systems appear noticeably, because of the improved surface state of the intermediate layer. This phenomenon is presumed as follows.

For a medium comprising a non-magnetic support sufficiently low in stiffness, when a surface of a formed non-magnetic layer formed is rubbed in a delivery system of a coating machine, the non-magnetic support is somewhat deformed and energy escapes to a back surface thereof. It is therefore difficult to be scratched. However, increasing the stiffness of the medium prevents the non-magnetic support from being deformed and energy caused by rubbing is directly given to a surface of an intermediate layer, which causes the surface to be scratched. The stiffness of the non-magnetic support is proportional to Young's modulus of the support, and increases in proportion to the third power of the thickness of the support. A PET film is liable to be remarkably scratched at a thickness of 20 µm or more. When a film having high Young's modulus such as a PEN or aramid film is used, it is liable to be remarkably scratched even at a thickness of less than 20 µm. In addition, filling the intermediate layer with an inorganic pigment or carbon black increases the stiffness of the intermediate layer, so that the stiffness of the medium is also increased. Scratches are therefore further liable to be developed.

An intermediate layer mainly composed of carbon black or containing carbon black in an amount required to obtain at least the conductivity or the shading property is also liable to be scratched. The reason for this is that the surface of the intermediate layer composed of carbon black is scratched by rubbing it with a guide roll, etc., in a delivery system of a coating machine because carbon black itself is a soft pigment. Even the intermediate layer having these scratches on the surface thereof can be used, scarcely exerting adverse effects, if a magnetic layer having a thickness of more than 1 µm is formed thereon, or the medium is used for applications other than saturation recording. However, when a magnetic layer having a very thin thickness of 1 µm or less is formed, the scratches are reproduced on the surface of the magnetic layer, resulting in a tendency to deteriorate the surface roughness and to produce fluctuations in thickness. In particular, when the medium is used for saturation recording or shorter wavelength recording, the scratches are liable to contribute to fluctuations in outputs and dropouts. Thus, in terms of the intermediate layer having multifunctions such as conductivity, surface properties and stiffness, the conventional intermediate layer have been insufficient.

The media having the intermediate layer described in Japanese Patent Unexamined Publication Nos. 5-217149 (U.S. Pat. No. 5,455,112) and 5-242455 are independent of the scratches on the surface of the intermediate layer, because the magnetic layer and the intermediate layer are formed in the wet state by the wet-on-wet system. However, according to this wet-on-wet system, the magnetic layer and the intermediate layer are concurrently formed in the wet state. Accordingly, the interface between the magnetic layer and the intermediate layer is liable to be disturbed, resulting in a tendency to produce fluctuations in thickness of the magnetic layer. In particular, the medium comprising the magnetic layer having a thickness of 1 µm or less is almost used for saturation recording, so that the scratches are liable to directly contribute to fluctuations in outputs. EPA 520,155 (Japanese Patent Unexamined Publication No. 5-73883) describes that fluctuations at the interface are improved. However, when the magnetic layer has a very thin thickness of 0.1 µm to 0.5 µm, the fluctuations are insufficiently improved. According to a comparison of Example 4-1 (coating in the wet state) with Comparative Example 4-4 |one-by-one (wet-on-dry) coating) of EPA 520,155 (Japanese Patent Unexamined Publication No. 5-73883), when the magnetic layer having a thickness of 0.5 µm is formed on the intermediate layer having a thickness of 3 µm, the one-by-one (wet-on-dry) coating can be without fluctuations in thickness, whereas it does not provide a satisfactory value in respect to the surface roughness of the intermediate layer, compared with the coating in the wet state.

SUMMARY OF THE INVENTION

The present inventors have conducted intensive investigation to provide a high density magnetic recording medium having a magnetic layer thickness of 0.1 µm to 0.5 µm which is good in surface roughness and excellent in reliability and electromagnetic characteristics, using the conventional one-by-one (wet-on-dry) coating system without use of the so-called wet-on-wet system. As a result, the present inventors have discovered that the above-mentioned problems can be solved at once by using an intermediate layer containing carbon black and a mixture of inorganic materials having specific particle sizes and specific Mohs' hardnesses, thus completing the present invention.

According to the present invention, there are provided (1) A magnetic recording medium comprising a non-magnetic intermediate layer having a thickness of 0.5 µm to 3.0 µm formed on at least one surface of a non-magnetic support, and a magnetic layer formed thereon, said magnetic layer being mainly composed of a ferromagnetic powder and a binder and having a thickness of 0.1 µm to 0.5 µm, in which said magnetic layer is formed on said intermediate layer being in a dry state, and said intermediate layer comprises (A) an inorganic material having an average particle size of 10 nm to 50 nm and a Mohs' hardness of 7 or less, (B) an inorganic material having an average particle size of 100 nm to 500 nm and a Mohs' hardness of 9 or more, (C) carbon black, a lubricant and a binder;

(2) The magnetic recording medium described in (1), in which when the parts by weight of the inorganic material (A) is taken as {A}, the parts by weight of the inorganic material (B) is taken as {B}, and the parts by weight of carbon black (C) is taken as {C}, the following equations are satisfied:

{A}:{B}=99:1–80:20

{C}/({A}+{B})=10–50% by weight;

(3) The magnetic recording medium described in (1) or (2), in which the inorganic material (A) contained in the intermediate layer is one member selected from the group consisting of granular α-iron oxide and granular titanium oxide, and the inorganic material (B) is one member selected from the group consisting of alumina and chromium oxide; and (4) The magnetic recording medium described in (1), (2) or (3), in which carbon black (C) contained in the intermediate layer has an average particle size of 10 nm to 30 nm and a specific surface area by B.E.T. method (BET) of 70 m²/g to 300 m²/g, and dibutylphthalate (DBP) oil absorption (cc/100 g) and BET (m²/g) satisfy the following equation:

45≦DBP oil absorption≦140–(0.233×BET)

DESCRIPTION OF THE PREFERRED EMBODIMENTS

The present invention is hereinafter described in more detail.

The intermediate layer of the magnetic recording medium of the present invention has a thickness of 0.5 to 3.0 µm. Being less than 0.5 µm in thickness deteriorates the surface properties of the intermediate layer due to the influence of a filler contained in the non-magnetic support, whereas exceeding 3.0 µm in thickness reduces shear force in coating to cause insufficient smoothing effect, resulting in a tendency to roughen a surface of the intermediate layer.

The intermediate layer of the magnetic recording medium of the present invention contains (A), (B) and (C) described below.

That is, (A) is an inorganic material having an average particle size of 10 nm to 50 nm and a Mohs' hardness of 7 or less, and preferably an inorganic material having a Mohs' hardness of 3 to 7.

The surface properties of the intermediate layer can be improved by the inorganic material (A). For this purpose, the particle size and the hardness of the inorganic material (A) are important. Theoretically, the surface of the intermediate layer can be smoothed by reducing the size of the inorganic material (A). However, if the particle size is reduced smaller than a certain size, the dispersibility is deteriorated and the good surface properties can not be obtained. On the other hand, if the particle size is too large, the dispersibility is also deteriorated and the good surface properties can not be obtained.

The average particle size of the inorganic material (A) is 10 nm to 50 nm, and preferably 20 nm to 40 nm.

The inorganic material (A) is preferably granular in shape. The term "granular" used herein means to have an aspect ratio (average major axial size/average minor axial size) of 1 to 2. The granular shape further improves the surface properties.

The inorganic material (A) is preferably a synthetic material having a uniform particle distribution. Preferred examples of the inorganic materials (A) include α-iron oxide (having a Mohs' hardness of 6), titanium oxide (having a Mohs' hardness of 5.5), calcium carbonate (having a Mohs' hardness of 3), silicon oxide (having a Mohs' hardness of 7) and barium sulfate (having a Mohs' hardness of 3.5). Of these, α-iron oxide and titanium oxide are preferred, and α-iron oxide is particularly preferred.

A method for synthesizing granular α-iron oxide used in the present invention is described in EPA 623,918 (Japanese Patent Unexamined Publication No. 6-111280, WO 9,408,336) and a method for synthesizing granular titanium oxide is described in EPA 520,155 (Japanese Patent Unexamined Publication No. 5-73883). They are also reported in other literatures. Surface treatment may be applied, for example, for adjustment of acid or base absorption, or for easy loosening of secondary particles, as so desired, and may be applied to both inorganic and organic substances. For example, TTO-55B manufactured by Ishihara Sangyo Kaisha, Ltd. is surface-treated by alumina.

The inorganic material (B) is an inorganic material having a Mohs' hardness of 9 or more, and is added to the intermediate layer, thereby adjusting the strength of the surface thereof. The average particle size thereof is 100 nm to 500 nm, and preferably 100 nm to 300 nm. If the particle size is smaller than 100 nm, the inorganic material (B) is difficult to appear on the surface, resulting in the lack of strength. Exceeding 500 nm unsuitably extremely deteriorates the surface roughness.

The inorganic material (B) is preferably a synthetic material, and preferred examples thereof include α-alumina (having a Mohs' hardness of 9), chromium oxide (having a Mohs' hardness of 9), silicon oxide (having a Mohs' hardness of 9.5), diamond for industrial use (having a Mohs' hardness of 10), aluminum nitride (having a Mohs' hardness of 9) and boron nitride (having a Mohs' hardness of 9.5). Of these, α-alumina and chromium oxide are preferred in terms of dispersibility, and α-alumina is particularly preferred.

As to the shape of the inorganic material (B), granular or angular particles can be used, and the angular particles having high relative abrasive ability are preferably used.

Commercial products thereof include AKP 30, AKP 50, HIT 30, HIT 50, HIT 60, HIT 70 and HIT 80 manufactured by Sumitomo Chemical Co., Ltd. They may be surface treated if necessary.

Taking the parts by weight of the inorganic material A) as {A} and the parts by weight of the inorganic material (B) as {B}, {A}:{B} ranges preferably from 99:1 to 80:20, and more preferably from 97:3 to 82:18, in terms of the surface properties and the strength.

The intermediate layer of the magnetic recording medium of the present invention contains carbon black as component (C).

The intermediate layer contains carbon black for two main purposes. One purpose is to maintain a lubricant in a coated film of the intermediate layer, and the other purpose is to obtain the conductivity. It is also necessary that the dispersibility is good to some extent, and that the surface roughness of the resulting intermediate layer is good.

For these purposes, the content of carbon black is required to be restricted to a certain range. When the content of carbon black is taken as {C}, {C}/({A}+{B}) is preferably within the range of 10 to 50% by weight, based on the above-mentioned inorganic materials (A) and (B), and more preferably within the range of 10 to 40% by weight. If the content is too low, it is insufficient to maintain the conductivity and it becomes difficult to maintain the lubricant. On the other hand, if the content is too high, the dispersibility is deteriorated and the surface properties of the resulting intermediate layer is extremely deteriorated.

Carbon black used in the present invention may be one produced by any of the furnace, channel, acetylene, thermal and lamp methods, and examples thereof include acetylene black, furnace black, channel black, roller and disk black and German naphthalene black. It is appropriately selected therefrom according to various conditions, but it is preferred to satisfy the following conditions:

The average particle size of carbon black is preferably 10 nm to 30 nm, and more preferably 15 nm to 30 nm. Being too small in size deteriorates the dispersibility, whereas being too large in size roughens the surface of the resulting intermediate layer.

The specific surface area by B.E.T. method (BET) of carbon black is preferably 70 m$^2$/g to 300 m$^2$/g, and more preferably 70 m$^2$/g to 250 m$^2$/g. If the BET is too small, voids of the coated film are decreased, resulting in a decreased amount of lubricant held in the intermediate layer. On the other hand, if the BET is too large, the amount of binder required is increased and the dispersibility is deteriorated.

It is preferred that the DBP oil absorption (cc/100 g) and the BET (m$^2$/g) satisfy the following equation:

$$45 \leq \text{DBP oil absorption} \leq 140-(0.233 \times \text{BET})$$

The conductivity of carbon black is specified by the DBP oil absorption and the specific surface area (BET), and mainly specified by the DBP oil absorption. Being too low in these values results in the insufficient conductivity, whereas being too high in these values enhances the structure of carbon black to cause the roughened surface of the intermediate layer. Further, if both the BET and the DBP oil absorption are increased, the dispersibility is extremely deteriorated. It is therefore preferred that the range of the DBP oil absorption satisfies the above-mentioned equation related to the BET value. Specific values of the DBP oil absorption are preferably 45 to 123 cc/100 g for a BET of 70 m$^2$/g, 45 to 110 cc/100 g for a BET of 125 m$^2$/g, and 45 to 81 cc/100 g for a BET of 250 m$^2$/g.

Specific examples of carbon black include #2400B, #2350B, #2300B, #2200B, #1000B, #990B, #980B, #970B, #960B, #950B, #900B, #850B, MCF88B, #55B, #52B, #50B, #47B, #45B #45L, #44B, #40B, #33B, #32B, #30B, MA-7B, MA-8B, MA-11B, MA-100B, MA-100R and #4000B manufactured by Mitsubishi Chemical Corporation, #80B and #70L manufactured by Asahi Carbon Co., Ltd., BLACK-PEARLS 900, 800 and 520, REGAL 660R and 500R and MOGUL-L manufactured by Cabot Co., and RAVEN 2000B, 1500B, 1255B, 1200B, 1170B, 1060B, 1040B, 1035B, 1020B, 1000B, 890H, 890B, 790B and 760B manufactured by Colombian Carbon Co.

In the present invention, various known lubricants can be used. Of these, fatty acid and/or fatty acid esters are preferably used. There can be used monobasic fatty acids each having 12 to 24 carbon atoms (which may contain unsaturated bonds, or may be branched), or monofatty acid esters, difatty acid esters and trifatty acid esters of monobasic fatty acids each having 10 to 24 carbon atoms (which may contain unsaturated bonds, or may be branched) and monohydric, dihydric, trihydric, tetrahydric, pentahydric or hexahydric alcohols each having 2 to 22 carbon atoms (which may contain unsaturated bonds, or may be branched) or cyclic or polysaccharide reducing alcohols such as sorbitan and sorbitol. They may be used in combination.

Specific examples of the monobasic fatty acids include lauric acid, myristic acid, palmitic acid, stearic acid, oleic acid, linoleic acid, linolenic acid, behenic acid, erucic acid and elaidic acid, and examples of the fatty acid esters include butyl myristate, butyl palmitate, butyl stearate, neopentyl glycol dioleate, sorbitan monostearate, sorbitan distearate, sorbitan tristearate, oleyl oleate, isocetyl stearate, isotridecyl stearate, octyl stearate, isooctyl stearate, amyl stearate and butoxyethyl stearate.

The effect of the fatty acids and/or fatty acid esters as the lubricants and dispersing agents is exhibited at a total content of 0.1% or more by weight based on the magnetic powders. An increase in content thereof significantly increases the effect thereof. However, if the total content exceeds 20% by weight based on the magnetic powders, the fatty acids and/or fatty acid esters can not remain in the magnetic layer to be exposed on surface of the coated films, resulting in adverse effects such as contamination of a magnetic head and a reduction in outputs. Accordingly, the total amount of the fatty acids and/or fatty acid esters contained in the magnetic layer is preferably 0.1 to 20% by weight, more preferably 1 to 15% by weight and most preferably 1 to 12% by weight, based on the magnetic powders.

It is not necessary for these fatty acids and/or fatty acid esters to be 100% pure, and they may contain impurities such as isomers, unreacted products, side reaction products, decomposed products and oxidized products, other than the main components. However, the content of these impurities are preferably 40% by weight or less, and more preferably 20% by weight or less, based on the total amount of the lubricants.

The content of the lubricant may be appropriately adjusted depending on its purpose, but it is preferably 1 to 20% by weight based on the total parts by weight of the inorganic material (A), the inorganic material (B) and carbon black.

The binders used in the present invention include thermoplastic resins, thermosetting or reactive resins, electron beam sensitive type modified resins and mixtures thereof, and combinations thereof may be appropriately selected according to the characteristics of the media and process conditions. It is preferred that the thermoplastic resins have a softening point of about 150° C. or less, an average molecular weight of about 5,000 to about 200,000, and a degree of polymerization of about 50 to about 2,000. It is also preferred that the thermosetting or reactive resins and the electron beam sensitive type modified resins have an average molecular weight and a degree of polymerization similar to those of the thermoplastic resins, and these resins are applied, dried and calender treated, followed by heating and/or electron beam irradiation, thereby increasing the molecular weight to infinity by reactions such as condensation and addition.

The following resins are preferably used as the binders. A combination of a vinyl chloride copolymer and a polyurethane resin is preferred among others.

Thermoplastic Resins

Vinyl Chloride Copolymers

Vinyl chloride copolymers are preferably copolymers having a vinyl chloride content of 60 to 95% by weight, particularly 60 to 90% by weight, and the average degree of polymerization thereof is preferably about 100 to about 500.

Such vinyl chloride copolymers include vinyl chloride-vinyl acetate-vinyl alcohol, vinyl chloride-hydroxyalkyl (meth)acrylate, vinyl chloride-vinyl acetate-maleic acid, vinyl chloride-vinyl acetate-vinyl alcohol-maleic acid, vinyl chloride-vinyl acetate-hydroxyalkyl (meth)acrylate, vinyl chloride-vinyl acetate-hydroxyalkyl (meth)acrylate-maleic acid, vinyl chloride-vinyl acetate-vinyl alcohol-glycidyl (meth)acrylate, vinyl chloride-hydroxyalkyl (meth)acrylate-glycidyl (meth)acrylate, vinyl chloride-vinyl acetate-vinyl alcohol-glycidyl (meth)acrylate, vinyl chloride-hydroxyalkyl (meth)acrylate-allyl glycidyl ether and vinyl chloride-vinyl acetate-allyl glycidyl ether copolymers. In particular, copolymers of vinyl chloride and monomers containing epoxy (glycidyl) groups are preferred.

Further, it is preferred that such vinyl chloride copolymers contain sulfuric acid groups and/or sulfo groups as polar groups (hereinafter referred to as S-containing polar groups). In the S-containing polar groups (—$SO_4Y$ and —$SO_3Y$), Y may be either H or an alkali metal. However, it is particularly preferred that Y is K, namely —$SO_4Y$ and —$SO_3Y$ are —$SO_4K$ and —$SO_3K$, respectively. The copolymer may contain either of these S-containing polar groups or both. When both are present, the ratio thereof is arbitrary. These S-containing polar groups are preferably contained in molecules in an amount of 0.01 to 10% by weight, and particularly in an amount of 0.1 to 5% by weight, in terms of S atoms.

In addition to the S-containing polar groups, —$OPO_2Y$, —$PO_3Y$, —COOY, amino (—$NR_2$) and —$NR_3Cl$ groups (wherein Y represents H or an alkali metal, and R represents H, methyl or ethyl) can also be added as polar groups if necessary. Of these, amino groups may not be used in combination with S-containing polar groups, and may be various ones. In particular, dialkylamino groups (preferably, alkyl has 1 to 10 carbon atoms) are preferred. Such amino groups are usually obtained by amine modification. A vinyl chloride-alkylcarboxylic acid vinyl ester copolymer is dispersed or dissolved in an organic solvent such as an alcohol, and an amine compound (a primary, secondary or tertiary amine such as a fatty acid amine, an alicyclic amine, an alkanolamine or an alkoxylalkylamine) and an epoxy group-containing compound for allowing saponification reaction to proceed are added thereto, thereby obtaining a desired amino group. Vinyl units containing the amino groups are preferably contained in an amount of 0.05 to 5% by weight. The ammonium base may be consequently contained therein.

A resin skeleton to which the S-containing polar group is bound is the vinyl chloride resin, which can be obtained by polymerizing vinyl chloride, an epoxy group-containing monomer and another monomer copolymerizable therewith as so desired in the presence of a radical generating agent having an S-containing strong acid radical such as potassium persulfate or ammonium persulfate. These radical generating agents are usually used in an amount of 0.3 to 9.0% by weight, and preferably in an amount of 1.0 to 5.0% by weight, based on the monomers. In polymerization, emulsion polymerization is preferably used, because many components are water-soluble, and suspension polymerization using an alcohol such as methanol as a polymerization medium and solution polymerization using a ketone as a solvent are also suitable. In this case, it is also possible to use a radical generating agent used in ordinary polymerization of vinyl chloride, in addition to the radical generating agent having an S-containing strong acid radical. Further, it is also possible to use a reducing agent such as formaldehyde sodium sulfoxylate, sodium sulfite or sodium thiosulfate in combination with the radical generating agent having an S-containing strong acid radical.

Polyurethane Resins

The polyurethane resins used in combination with the vinyl chloride resins are particularly effective with respect to good wear resistance and good adhesion to a support. They may have polar groups or hydroxyl groups on side chains, and particularly, it is preferred that they have S- or P-containing polar groups.

Such polyurethane resins are obtained by the reaction of hydroxyl group-containing resins, such as polyester polyols and/or polyether polyols, with polyisocyanate-containing compounds. The resins are obtained by polymerizing starting materials described in detail below to a number average molecular weight of about 500 to about 200,000, and the Q value (weight average molecular weight/number average molecular weight) thereof is about 1.5 to about 4.

Preferred examples of the polar groups contained in the polyurethane resins include —$SO_3M$ (sulfonic acid group) and —$SO_4M$ (sulfuric acid group) as the S-containing polar groups, =$PO_3M$ (phosphonic acid group), =$PO_2M$ (phosphinic acid group), =POM (phosphonous acid group), —P=O($OM_1$)($OM_2$) and —OP=O($OM_1$)($OM_2$) as the P-containing polar groups, and further —COOM, —$NR_3X$, —$NR_2$, —OH, epoxy, —SH and —CN, wherein M, $M_1$ and $M_2$ each represent H, Li, Na, K, —$NR_3$ or —$NHR_2$, R represents an alkyl group or H, and X represents a halogen atom. In particular, M is preferably Na. The polyurethane resin in which at least one polar group selected from these polar groups is introduced by copolymerization or addition reaction is preferably used. These polar groups are preferably contained in molecules in an amount of 0.01 to 10% by weight, and particularly in an amount of 0.02 to 3% by weight, in terms of the atoms. These polar groups may be introduced into main chains of skeleton resins or branched chains.

It is preferred that the polyurethane resins used in the present invention each have a glass transition temperature Tg within the range of –20° C. to 80° C. and at least two kinds of them different from each other in Tg are contained in the binder. Further, the total amount of the polyurethane resins is preferably 10 to 90% by weight based on the total amount of the binder. The inclusion of such plural polyurethane resins is preferred in that the running stability, the calendering processability and the electromagnetic characteristics under a high-temperature environment are balanced.

Such polyurethane resins are obtained by reacting specific polar group-containing compounds and/or starting materials containing raw material resins reacted with specific polar group-containing compounds in solvents or without use of solvents.

Thermosetting Resins or Reactive Resins

The thermosetting resins include polycondensable phenol resins, epoxy resins, hardenable polyurethane resins, urea resins, butyral resins, formal resins, melamine resins, alkyd resins, silicone resins, reactive acrylic resins, polyamide resins, epoxy-polyamide resins, saturated polyester resins and urea-formaldehyde resins.

Of the above-mentioned resins, resins having hydroxyl groups at termini or on side chains thereof are preferred as reactive resins, because crosslinking using isocyanates or electron beam crosslinking can be easily utilized. Further, acidic polar groups and basic polar groups including —COOH, —SO$_3$M, —OSO$_3$M, —OPO$_3$X, —PO$_3$X, PO$_2$X, —NR$_3$Cl and —NR$_2$ may be introduced into the termini or the side chains as the polar groups, wherein M and X have the same meanings as defined above. The inclusion of these groups is suitable for an improvement in dispersibility. They may be used alone or in combination.

As crosslinking agents for curing such binder resins, various kinds of polyisocyanates can be used. Preferred examples of the crosslinking agents include crosslinking agents obtained by modifying one or more of tolylene diisocyanate, hexamethylene diisocyanate and methylene diisocyanate to compounds each having a plurality of hydroxyl groups such as trimethylolpropane, and isocyanurate type crosslinking agents in which 3 molecules of diisocyanate compounds are combined. The content of the crosslinking agent is preferably 10 to 30 parts by weight per 100 parts by weight of resin. The binder resin can be three-dimensionally bound to hydroxyl groups contained therein through the crosslinking agent to improve the durability of a coated layer.

Specific examples thereof include Coronate L, HL and 3041 manufactured by Nippon Polyurethane Co., Ltd., 24A-100 and TPI-100 manufactured by Asahi Chemical Industry Co., Ltd., and Desmodule L and N manufactured by B. F. Goodrich Co. They are added to the above-mentioned resins in an amount of 1 to 50% by weight.

In order to cure such reactive or thermosetting resins, the resins are generally heated in a heating oven at 40° to 80° C. for 6 to 100 hours, or transferred at low speed through an oven heated at 80° to 120° C.

Electron Beam Hardenable Resins

As the electron beam hardenable resins, resins in which (meth)acrylic double bonds are introduced for electron beam sensitive modification can be used. The term "(meth)acrylic double bond" used herein means a (meth)acryloyl group which is a residue of (meth)acrylic acid, a (meth)acrylic ester or a (meth)acrylic amide.

Well-known methods for conducting the electron beam sensitive modification include a urethane modification which reacts a product (adduct) of tolylene diisocyanate (TDI) and 2-hydroxyethyl (meth)acrylate (2-HEMA) with a resin, an improved urethane modification which reacts a monomer having one or more ethylenic unsaturated double bonds and one isocyanate group in a molecule, and having no urethane bond in the molecule, with a resin, and an ester modification which reacts a compound having a (meth) acrylic group and a carboxylic anhydride group or a dicarboxylic acid group with a resin having a hydroxyl group or a carboxylic acid group. Of these, the improved urethane modification is preferably employed, because an increase in the content of a vinyl chloride copolymer does not make a coated layer brittle, and a coated layer excellent in dispersibility and surface properties can be obtained.

The content of electron beam sensitive groups are 1 to 40% by weight, and preferably 10 to 30% by weight, based on the hydroxyl group component, from the viewpoints of stability in production, electron beam hardenability, etc. In particular, in the case of a vinyl chloride copolymer, monomers are reacted so as to give 1 to 20 functional groups and preferably 2 to 10 functional groups per molecule, thereby being capable of obtaining an electron beam hardenable resin excellent in both dispersibility and hardenability.

When these electron beam sensitive modified resins are used, known multifunctional acrylates may be mixed therewith in an amount of 1 to 50% by weight based on the total resin component, in order to improve the crosslinking rate.

When the electron beam sensitive modified resins are used as the binders, methods using electron beams and/or ultraviolet rays as irradiation sources in curing are advantageous from the viewpoints of control of absorbed doses, introduction into production lines and shielding of ionizing radiation. In the case of the electron beams, it is convenient to irradiate the resins so as to give an absorbed dose of 20 to 200 kilograys by use of electron beam accelerators. In electron beam crosslinking, it is important for the resins to be irradiated with the electron beams in an atmosphere of an inert gas, such as N$_2$, He or CO$_2$, having an oxygen concentration of 1% or less. The reason for this is that O$_3$ produced by radiation exposure is prevented from capturing radicals. On the other hand, when the ultraviolet rays are used, known photopolymerization sensitizers are added to the binders containing the electron beam sensitive modified resins, and ultraviolet lamps such as xenon and hydrogen discharge tubes are used.

The content of the binder may be appropriately adjusted depending on its purpose, but it is preferably 10 to 100% by weight based on the total parts by weight of the inorganic material (A), the inorganic material (B) and carbon black.

Additives other than described above include agents having lubricating effect, antistatic effect, dispersing effect, plastic effect, etc.

As to dispersion, kneading treatment is conducted by use of known kneaders (such as extruders, open kneaders, pressure kneaders and continuous kneaders), or materials mixed in dissolvers, etc., are dispersed by use of known dispersing machines (such as vertical or horizontal sand grinder mills, attriters and ball mills), followed by adjustment with appropriate organic solvents to a viscosity suitable for application.

Intermediate layer coating liquids can be applied by use of known roll coaters (such as gravure type, reverse type and dip type coaters), known extrusion type coaters (such as nozzle coaters), etc.

The magnetic layer of the magnetic recording medium of the present invention has a thickness of 0.1 to 0.5 µm. Being less than 0.1 µm in thickness is liable to fluctuate the thickness of the coated layer, whereas exceeding 0.5 µm in thickness is liable to deteriorate the self-demagnetization and the overwrite characteristics in shorter wavelength recording.

The ferromagnetic powders used in the present invention include ferromagnetic metal powders, hexagonal ferrite powders and other general magnetic powders.

Ferromagnetic Metal Powders

It is preferred that metal alloy powders have a coercive force (Hc) of 1500 to 3000 Oe, a saturation magnetization (δs) of 120 to 160 emu/g, an average major axial size of 0.05 to 0.2 μm, an average minor axial size of 10 to 20 μm and an aspect ratio of 1.2 to 20. The Hc of the magnetic recording medium prepared is preferably 1500 to 3000 Oe.

Specifically, the metal alloy powders include powders mainly composed of ferromagnetic metal elements such as α-Fe, Fe—Co, Fe—Ni, Fe—Co—Ni, Co and Co—Ni. When such ferromagnetic metal powders are used, ferromagnetic metals (such as Fe, Co and Ni) or alloys are preferably contained in an amount of 70% by weight or more, and more preferably in an amount of 75% by weight or more. In the ferromagnetic metal powders mainly composed of Fe and containing at least Co, the ratio of Co atoms to Fe atoms is preferably 0 to 40 mol %, and more preferably 6 to 35 mol %. Further, it is preferred that the ferromagnetic metal powders mainly composed of Fe and/or Co further contain at least one of rare earth elements including Y. Furthermore, in these ferromagnetic metal powders, particles may have oxide coatings on their surface, surface of particles may be partially carbonized or nitrided, or carbonaceous coatings may be formed on surface of particles.

These ferromagnetic metal powders may be produced by known methods. Examples of the methods for producing the ferromagnetic metal powders include methods of reducing organic acid salts (mainly oxalates) of ferromagnetic metals with reducing gas such as hydrogen, methods of reducing hydrous iron oxide or iron oxide obtained by heating hydrous iron oxide with reducing gas such as hydrogen, methods of thermally decomposing metal carbonyl compounds, methods of adding reducing agents such as sodium boron hydride, hypophosphites and hydrazine to aqueous solutions of ferromagnetic alloys to reduce the alloys, and methods of evaporating metals in an atmosphere of inert gas under low pressure to obtain fine powders.

The ferromagnetic metal powders thus obtained may be subjected to known gradual oxidation treatment. The methods of gradual oxidation treatment include methods of immersing the powders in organic solvents, followed by drying, methods of immersing the powders in organic solvents, and then, supplying oxygen-containing gas therein to form oxide coatings on surface of particles, followed by drying, and methods of adjusting the partial pressure of oxygen gas and inert gas without use of organic solvents to form oxide coatings on surface of particles.

Hexagonal Ferrite Powders

It is preferred that hexagonal ferrite powders have an Hc of 1000 to 20000 Oe, a as of 50 to 70 emu/g, an average plate size of 30 to 80 nm and a plate ratio of 3 to 7. The Hc of the magnetic recording medium prepared is preferably 1200 to 2200 Oe.

Examples of the hexagonal ferrite powders include Ba-ferrite, Sr-ferrite, Pb-ferrite, Ca-ferrite and ferrite substituted by metal atoms matched to Fe atoms thereof in valency. Specifically, there are mentioned magneto plumbite type Ba-ferrite and Sr-ferrite, and further, magneto plumbite type Ba-ferrite and Sr-ferrite partially containing spinel phases. In particular, ferrite substituted by metal atoms matched to Fe atoms in valency for controlling the coercive force of Ba-ferrite or Sr-ferrite is preferred. Preferred examples of the metal atoms used for substitution for controlling the coercive force include Co—Ti, Co—Ti—Sn, Co—Ti—Zr, Cu—Zn, Cu—Ti—Zn and Ni—Ti—Zn. In tabular hexagonal ferrite powders, the average plate size is preferably 0.01 to 0.1 μm, and the average plate thickness/ the plate size is preferably ½ to 1/20. The plate size of hexagonal tabular magnetic powders means the size of hexagonal plates, which is measured under an electron microscope.

General Magnetic Powders

All the magnetic powders described above may contain small amounts of elements such as Al, Si, Cr, Mn, Co, Ni, Zn, Cu, Zr, Ti, Bi, Ag, Pt, B, C, P, N, Y, S, Sc, V, Mo, Rh, Pd, Ag, Sn, Sb, Te, Ba, Ta, W, Re, Au, Hg, Pb, La, Sr and rare earth elements. Of these elements, the addition of at least one of Al, Si, P and rare earth elements (including Y) is effective in improving the particle size distribution and preventing sintering.

The total amount of the above-mentioned elements added is preferably 0.5 to 8% by weight, and more preferably 1 to 6% by weight based on the magnetic powder.

Further, these magnetic powders may be coated with Al, Si, P or oxide coatings thereof, or may be surface treated with coupling agents having Si, Al, Ti, etc. or various surface active agents, etc., The total amount of the above-mentioned materials provided on surface of the powders is preferably 0.3 to 5% by weight, and more preferably 1 to 5% by weight based on the magnetic powder.

The ferromagnetic metal powders contain water-soluble inorganic ions such as Na, K, Ca, Fe and Ni in some cases, and the amount thereof is preferably 500 ppm or less, and more preferably 300 ppm or less.

These magnetic powders may be previously treated before dispersion with dispersing agents, lubricants, surface active agents, antistatic agents, etc.

The water content of the magnetic powder is generally 0.1 to 2%, but preferably optimized depending on the kind of binder.

As to dispersion, kneading treatment is conducted by use of known kneaders (such as extruders, open kneaders, pressure kneaders and continuous kneaders), or materials mixed in dissolvers, etc. are dispersed by use of known dispersing machines (such as vertical or horizontal sand grinder mills, attriters and ball mills), followed by adjustment with appropriate organic solvents to a viscosity suitable for application.

Although magnetic coating liquids can be applied by known coating methods, they are preferably applied by use of extrusion type coaters (such as nozzle coaters). The reason for this is that shear is given to the surface of the intermediate layer to prevent attack of the solvents contained in the magnetic coating liquids, and that a coated layer thickness of 0.1 μm to 0.5 μm can be obtained with high precision.

Known films can be used for the non-magnetic support used in the present invention. Such films are formed of polyesters such as polyethylene terephthalate (PET) and polyethylene naphthalate (PEN), polyolefins, polyamides, polyimides, polysulfones, cellulose triacetate and polycarbonates. Of these, PET, PEN and aromatic polyamides are preferably used, and particularly, composite films obtained by multilayer coextrusion of 2 or 3 kinds of PET or PEN are preferred. The use of these films improves the balance among the electromagnetic characteristics, the durability, the friction characteristics, the film strength and the productivity.

Further, fillers are preferably added to the non-magnetic support. Such fillers include inorganic materials such as oxides and carbonates of Al, Ca, Si, Ti, etc., and organic compounds such as fine powders of acrylic resins. The surface characteristics can be freely controlled by changing the size and amount thereof. As a result, it becomes possible to control the electromagnetic characteristics, the durability, the friction characteristics, etc.

Furthermore, these non-magnetic support may be previously subjected to corona discharge treatment, plasma discharge and/or polymerization treatment, coating treatment of adhesion improving agents, dustproof treatment, relaxation treatment by heat and/or humidification.

As to the surface roughness of the non-magnetic support, the center line average height Ra is preferably 0.03 μm or less, more preferably 0.02 μm or less, and most preferably 0.01 μm or less. Further, it is preferred that not only the surface roughness is small, but also large peaks of 0.5 μm or more do not exist.

The heat shrinkage percentage of the non-magnetic support in the longitudinal and width directions at 100° C. for 30 minutes is preferably 3% or less, and more preferably 1.5% or less. The heat shrinkage percentage at 80° C. for 30 minutes is preferably 1% or less, and more preferably 0.5% or less.

The thickness of the non-magnetic support is preferably 4.0 to 75.0 μm. If the non-magnetic support is too thin, the mechanical strength of the magnetic recording medium can not be kept, resulting in a reduction in durability. On the other hand, if the non-magnetic support is too thick, the total thickness of the magnetic recording medium becomes too large, unfavorably resulting in a decreased recording amount per unit volume.

The present invention is now illustrated in greater detail with reference to the following examples and comparative examples, but the present invention is not to be construed as being limited by these specific embodiments. The figures shown on the right of the following composition tables are parts by weight.

Evaluation Methods (1) Surface Roughness Ra, Rz

This property was tested by the use of a surface roughness testing devise (produced by Rank-Taylor-Hobson Corp and marketed under trademark designation of "Talystep") at 50,000 magnifications and a measuring wavelength λ of 3.3 to 167 μm in accordance with JIS (Japanese Industrial Standard) B-0601 (1982). The example length was 0.5 mm (the number of values n=5) and the unit was reduced to nm.

(2) Abrasion (Intermediate Layer)

A 62-μm thick film provided on both surfaces with intermediate layer was pressed to form a 3.5-inch disk. Each surface of this disk was pressed against a abrasive tape [GC 8000 (abrasive particle:SiC) manufactured by Nihon Micro Coating Co., Ltd.] at a pressure of 1.0 kg/cm² by use of compressed air while rotating the disk at about 200 rpm, and the time until a scratch was observed was measured every 5 seconds.

(3) Electromagnetic Characteristics

An FD1331 drive manufactured by NEC Corp. was modified so as to give 0 track at the outermost perimeter and 239 tracks at the innermost perimeter, and 10kFCI, 35kFCI and RES (resolution) were shown compared with a reference disk.

As the standard disk, a 12-MB floppy TDK reference disk was used. For modulation (MOD), measurements were shown as such.

35 kFCI (=35000 FCI):

FCI=Flux-change per inch (The number of ½ wavelength per inch) The wavelength at 35 kFCI is about 1.45 μm.

(4) Overwrite Characteristics 10-kFCI signals were first written into 0 track at the outermost perimeter, and 35-kFCI signals were overwritten thereof. Then, the residual 10-kFCI signals were measured. The values at this time were as follows:

42 dB for a magnetic layer thickness of 0.30 μm 32 dB for a magnetic layer thickness of 2.0 μm

EXAMPLE 1

Intermediate layer coating liquid (1) and magnetic coating liquid (a) as shown below were prepared.

| Intermediate Layer Coating Liquid (1) | |
| --- | --- |
| Inorganic material A | 92 parts by weight |
| Granular α-iron oxide | |
| (Mohs' hardness: about 6) | |
| Average particle size: 30 nm | |
| BET: 35 m²/g | |
| (Nanotite 30 manufactured by Showa Denko K. K.) | |
| Inorganic material B | 8 parts by weight |
| α-Alumina | |
| (Mohs' hardness: 9) | |
| Average particle size: 200 nm | |
| BET: 9.5 m²/g | |
| (HIT-50 manufactured by Sumitomo Chemical Co., Ltd.) | |
| Carbon black C | 18 parts by weight |
| Average particle size: 24 nm | |
| BET: 125 m²/g | |
| DBP oil absorption: 110 cc/100 g | |
| pH: 8.0 | |
| (#40B manufactured by Mitsubishi Chemical Corporation) | |
| Electron beam sensitive vinyl chloride resin [NV 30%] | 66 parts by weight |
| Vinyl chloride-epoxy-containing monomer copolymer | |
| Average degree of polymerization: 310 | |
| Epoxy content: 3% by weight | |
| S content: 0.6% by weight | |
| Acryl content: 6 mol/mol | |
| Tg: 60°C. | |
| Electron beam sensitive polyurethane resin [NV 40%] | 22 parts by weight |
| Phosphorus group and hydroxy group containing polyester polyurethane | |
| GPV Mn: 26000 | |
| Acryl content: 6/molecule | |
| Tg: 20°C. | |
| Methyl ethyl ketone | 82 parts by weight |
| Toluene | 8 parts by weight |
| Cyclohexanone | 74 parts by weight |
| | (370 parts by weight |

The components described above were dispersed in a sand grinder mill. Then, the following components were added thereto, followed by further dispersion to prepare an intermediate layer coating liquid.

| Butyl stearate | 1 part by weight |
| --- | --- |
| Sorbitan monostearate | 3 parts by weight |
| Neopentyl glycol dioleate | 9 parts by weight |
| Methyl ethyl ketone | 70 parts by weight |
| Toluene | 7 parts by weight |
| Cyclohexanone | 63 parts by weight |
| | (523 parts by weight) |

| Magentic Coating Liquid (a) | |
|---|---|
| Magnetic metal powder, Fe—Co—Al alloy BET: 50 m²/g Hc: 1640 Oe σs: 135 emu/g Co/Fe: 10% by weight Major axial size: 0.2 µm Minor axial size: 20 nm | 100 parts by weight |
| Carbon black Average particle size: 350 nm BET: 7 m²/g DBP oil absorption: 41 ml/100 g pH: 8.0 (SEVACARB-MT manufactured by Colombian Carbon Co.) | 6 parts by weight |
| α-Alumina Average paricle size: 200 nm BET: 9.5 m²/g (HIT-50 manufactured by Sumitomo Chemical Co., Ltd.) | 15 parts by weight |
| Thermosetting vinyl chloride resin (MR-110 manufactured by Nippon Zeon Co., Ltd.) | 14 parts by weight |
| Thermosetting polyurethane resin [NV 40%] (UR-8200 manufactured by Toyobo Co., Ltd.) | 15 parts by weight |
| Methyl ethyl ketone | 80 parts by weight |
| Toluene | 30 parts by weight |
| Cyclohexanone | 90 parts by weight |
| | (450 parts by weight) |

The components described above were dispersed in a sand grinder mill. Then, the following components were added thereto, followed by further dispersion to prepare a magnetic coating liquid.

| Butyl stearate | 1 part by weight |
|---|---|
| Sorbitan monostearate | 3 parts by weight |
| Neopentyl glycol dioleate | 5 parts by weight |
| Methyl ethyl ketone | 55 parts by weight |
| Toluene | 20 parts by weight |
| Cyclohexanone | 65 parts by weight |
| | (599 parts by weight) |

Immediately before coating, Coronate L (solid content: 75%) manufactured by Nippon Polyurethane Co., Ltd. was added as a crosslinking agent to magnetic coating liquid (a) in an amount of 29% by weight based on the resin component contained in the coating liquid.

Intermediate layer coating liquid (1) was applied to one surface of a 62-µm thick biaxial oriented PET film both surfaces of which were subjected to treatment for enhancing adhesion, and dried. The intermediate layer, hardened by irradiation with an electron beam in an atmosphere of $N_2$ gas, was coated with magnetic coating liquid (a) by use of an extrusion type die nozzle coater, followed by random orientation and drying to form a magnetic layer. Then, calendering (mirror finishing treatment) was conducted thereto. The back surface of the film was further treated similarly. Thus, the magnetic layer having a thickness of 0.3 µm and the intermediate layer having a thickness of 1.5 µm were formed on both surfaces of the film. The resulting product was stamped out to a doughnut-like form having a diameter of 3.5 inches, and allowed to stand at 60° C. for 24 hours to obtain a floppy disk.

Electron beam irradiation conditions:
Electrocurtain type electron beam accelerator
Accelerating voltage: 150 keV
Electrode current: 10 mA
Absorbed dose: 50 kGray
Calendering conditions:
Seven-stage calender of steel-elastic rolls
Temperature: 100° C.
Linear load: 350 kg/cm

EXAMPLES 2 to 5

Floppy disks were obtained in the same manner as with Example 1, except that the thickness of the intermediate layer, the application of calendering of the intermediate layer before coating of the magnetic coating liquid, and the time of electron beam irradiation (before or after formation of the magnetic layer) were changed as shown in Table 1. In this case, electron beam irradiation "before formation of the magnetic layer" means that the electron beam was irradiated after coating of the intermediate layer coating liquid, drying thereof and calendering when specified so, and electron beam irradiation "after formation of the magnetic layer" means that the magnetic layer was formed on the intermediate layer formed by applying the intermediate layer coating liquid, drying it and subjecting it to calendering when specified so, followed by irradiation of the electron beam.

TABLE 1

| | Thickness of Intermediate Layer (µm) | Calendering of Intermediate Layer | Time of irradiation of Electron Beam |
|---|---|---|---|
| Example 2 | 1.5 | not applied | after formation of the magnetic layer |
| Example 3 | 1.5 | applied | before formation of the magnetic layer |
| Example 4 | 1.5 | applied | after formation of the magnetic layer |
| Example 5 | 0.8 | applied | before formation of the magnetic layer |

EXAMPLES 6 to 11

Floppy disks were obtained in the same manner as with Example 1, with the exception that intermediate layer coating liquids (2) to (7) each was substituted for intermediate layer coating liquid (1). Intermediate layer coating liquids (2) to (7) were prepared by mixing inorganic materials A and B in intermediate layer coating liquid (1) at ratios shown in Table 2.

TABLE 2

| | Intermediate Layer Coating Liquid | A : B (weight ratio) |
|---|---|---|
| Example 6 | (2) | 99 : 1 |
| Example 7 | (3) | 97 : 3 |
| Example 8 | (4) | 95 : 5 |
| Example 9 | (5) | 88 : 12 |
| Example 10 | (6) | 85 : 15 |
| Example 11 | (7) | 80 : 20 |

EXAMPLE 12

A Floppy disk was obtained in the same manner as with Example 1, with the exception that intermediate layer coating liquid (8) was substituted for intermediate layer coating liquid (1). Inorganic material B in intermediate layer coating liquid (1) was previously dispersed with part of the resins in intermediate layer coating liquid (1) by use of a sand grinder mill, and the resulting coating liquid containing inorganic material B was mixed with a coating liquid in which the remainder of the starting materials was dispersed, followed by further dispersion to obtain intermediate layer coating liquid (8) having the same kinds of starting materials and amount as intermediate layer coating liquid (1).

EXAMPLES 13 to 17

Floppy disks were obtained in the same manner as with Example 1, with the exception that intermediate layer coating liquids (9) to (13) each was substituted for intermediate layer coating liquid (1). Intermediate layer coating liquids (9) to (13) were prepared by using carbon black shown in Table 3 in place of carbon black in intermediate layer coating liquid (1).

TABLE 3

| | Intermediate Layer Coating Liquid | Average Particle Size (nm) | BET ($m^2/g$) | DBP Oil Absorption (cc/100 g) | pH |
|---|---|---|---|---|---|
| Example 13 | (9) | 22 | 134 | 100 | 3.4 |
| | (MA-100B manufactured by Mitsubishi Chemical Corporation) | | | | |
| Example 14 | (10) | 30 | 85 | 113 | 8.0 |
| | (#30B manufactured by Mitsubishi Chemical Corporation) | | | | |
| Example 15 | (11) | 16 | 250 | 71 | 8.0 |
| | (#960B manufactured by Mitsubishi Chemical Corporation) | | | | |
| Example 16 | (12) | 15 | 260 | 47 | 8.0 |
| | (#2300B manufactured by Mitsubishi Chemical Corporation) | | | | |
| Example 17 | (13) | 18 | 200 | 50 | 8.0 |
| | (MCF88B manufactured by Mitsubishi Chemical Corporation) | | | | |

EXAMPLE 18

Intermediate layer coating liquid (14) was prepared according to the following instructions:

| Intermediate Layer Coating Liquid (14) | |
|---|---|
| Inorganic material A | 92 parts by weight |
| Granular α-iron oxide | |
| (Mohs' hardness: about 6) | |
| Average particle size: 30 nm | |
| BET: 35 $m^2/g$ | |
| (Nitite 30 manufactured by Showa Denko K. K.) | |
| Inorganic material B | 8 parts by weight |
| α-Alumina | |
| (Mohs' hardness: 9) | |
| Average particle size: 200 nm | |
| BET: 9.5 $m^2/g$ | |
| (HIT-50 manufactured by Sumitomo Chemical Co., Ltd.) | |
| Carbon black C | 40 parts by weight |
| Average particle size: 24 nm | |
| BET: 125 $m^2/g$ | |
| DBP oil absorption: 53 cc/100 g | |
| pH: 8.0 | |
| (#45B manufactured by Mitsubishi Chemical Corporation) | |
| Electron beam sensitive vinyl chloride resin [NV 30%] | 78 parts by weight |
| Vinyl chloride-epoxy-containing monomer copolymer | |
| Electron beam sensitive polyurethane resin [NV 40%] | 25 parts by weight |
| Phosphorus group and hydroxy group containing polyester polyurethane | |
| Methyl ethyl ketone | 128 parts by weight |
| Toluene | 13 parts by weight |
| Cyclohexanone | 115 parts by weight |
| | (499 parts by weight) |

The components described above were dispersed in a sand grinder mill. Then, the following components were added thereto, followed by further dispersion to prepare an intermediate layer coating liquid.

| | |
|---|---|
| Butyl stearate | 1 part by weight |
| Sorbitan monostearate | 3 parts by weight |
| Neopentyl glycol dioleate | 9 parts by weight |
| Methyl ethyl ketone | 55 parts by weight |
| Toleune | 6 parts by weight |
| Cyclohexanone | 49 parts by weight |
| | (622 parts by weight) |

A Floppy disk was obtained in the same manner as with Example 1, with the exception that intermediate layer coating liquid (14) was substituted for intermediate layer coating liquid (1).

EXAMPLE 19

A floppy disk was obtained in the same manner as with Example 1, with the exception that intermediate layer coating liquid (15) was substituted for intermediate layer coating liquid (1). Intermediate layer coating liquid (15) was prepared by using carbon black: shown below in place of carbon black in intermediate layer coating liquid (14).

Carbon black

Average particle size: 30 nm

BET: 70 $m^2/g$

DBP oil absorption: 50 cc/100 g pH: 7.0

(RAVEN 760B manufactured by Colombian Carbon Co.)

EXAMPLE 20

Intermediate layer coating liquid (16) was prepared according to the following instructions:

| Intermediate Layer Coating Liquid (16) | |
|---|---|
| Inorganic material A | 88 parts by weight |
| Granular α-iron oxide | |
| (Mohs' hardness: about 6) | |
| Average particle size: 30 nm | |
| BET: 35 $m^2/g$ | |
| (Nitite 30 manufactured by Showa Denko K. K.) | |
| Inorganic material B | 12 parts by weight |
| α-Alumina | |
| (Mohs' hardness: 9) | |
| Average particle size: 200 nm | |
| BET: 9.5 $m^2/g$ | |
| (HIT-50 manufactured by Sumitomo Chemical Co., Ltd.) | |

Intermediate Layer Coating Liquid (16)

| | |
|---|---|
| Carbon black C | 18 parts by weight |
| Average particle size: 24 nm | |
| BET: 125 m²/g | |
| DBP oil absorption: 110 cc/100 g | |
| pH: 8.0 | |
| (#40B manufactured by Mitsubishi Chemical Corporation) | |
| Electron beam sensitive vinyl chloride resin | 17 parts by weight |
| (MR-110 manufactured by Nippon Zeon Co., Ltd.) | |
| Thermosetting polyurethane resin [NV 40%] | 18 parts by weight |
| (UR-8200 manufactured by Toyobo Co., Ltd.) | |
| Methyl ethyl ketone | 109 parts by weight |
| Toluene | 11 parts by weight |
| Cyclohexanone | 97 parts by weight |
| | (370 parts by weight) |

The components described above were dispersed in a sand grinder mill. Then, the following components were added thereto, followed by further dispersion to prepare an intermediate layer coating liquid.

| | |
|---|---|
| Butyl stearate | 1 part by weight |
| Sorbitan monostearate | 3 parts by weight |
| Neopentyl glycol dioleate | 9 parts by weight |
| Methyl ethyl ketone | 70 parts by weight |
| Toluene | 7 parts by weight |
| Cyclohexanone | 63 parts by weight |
| | (523 parts by weight) |

Immediately before coating, Coronate L (solid content: 75%) manufactured by Nippon Polyurethane Co., Ltd. was added as a crosslinking agent to intermediate layer coating liquid (16) in an amount of 29% by weight based on the resin component contained in the coating liquid. A Floppy disk was obtained in the same manner as with Example 1, with the exception that this coating liquid was substituted for intermediate layer coating liquid (1) and irradiation of the electron beam was omitted.

EXAMPLES 21 to 23

Floppy disks were obtained in the same manner as with Example 1, with the exception that intermediate layer coating liquids (17) to (19) each was substituted for intermediate layer coating liquid (1). Intermediate layer coating liquids (17) to (19) were prepared by using the same amount of inorganic materials shown in Table 4 in place of inorganic material B in intermediate layer coating liquid (1).

TABLE 4

| | Intermediate Layer Coating Liquid | Kind | Average Particle Size (nm) | BET (m²/g) | Mohs' Hardness |
|---|---|---|---|---|---|
| Example 21 | (17) | α-alumina | 120 | 18.5 | 9 |
| | (HIT-80 manufactured by Sumitomo Chemical Co., Ltd.) | | | | |
| Example 22 | (18) | chromium oxide | 130 | 6.7 | 9 |
| | (U-1 manufactured by Nippon Chemical Industrial Co., Ltd.) | | | | |
| Example 23 | (19) | silicon carbide | 150 | 18.2 | 9.5 |
| | (MSC-20 manufactured by Mitsui Toatsu Chemicals, Inc.) | | | | |

EXAMPLES 24 and 25

Floppy disks were obtained in the same manner as with Example 1, with the exception that intermediate layer coating liquids (20) and (21) each was substituted for intermediate layer coating liquid (1). Intermediate layer coating liquids (20) and (21) were prepared by using the same amount of inorganic materials shown in Table 5 in place of an inorganic material A in intermediate layer coating liquid (1).

TABLE 5

| | Intermediate Layer Coating Liquid | Kind | Average Particle Size (nm) | BET (m²/g) | Mohs' Hardness |
|---|---|---|---|---|---|
| Example 24 | (20) | titanium oxide | 35 | 40 | 5 |
| | (TTO-55B (rutile type) manufactured by Ishihara Sangyo Kaisha, Ltd.) | | | | |
| Example 25 | (21) | barium sulfate | 30 | — | 3.5 |
| | (BF 20 manufactured by Sakai Chemical Industry Co., Ltd.) | | | | |

Comparative Example 1

Magnetic coating liquid (a) was directly applied to one surface of a 62-μm thick biaxial oriented PET film, both surfaces of which were subjected to treatment for enhancing adhesion, without use of the intermediate layer, subjected to random orientation, and dried to form a magnetic layer. The back surface of the film was treated similarly. Thus, a magnetic layer having a thickness of 0.3 μm was formed on both the surfaces of film. The resulting product was stamped out to a doughnut-like form having a diameter of 3.5 inches, and allowed to stand at 60° C. for 24 hours to obtain a floppy disk.

Comparative Example 2

A floppy disk was obtained in the same manner as with Comparative Example 1 with the exception that the thickness of the magnetic layer was converted to 2.0 μm.

Comparative Examples 3 to 6

Floppy disks were obtained in the same manner as with Example 1, with the exception that intermediate layer coating liquids (22) to (25) each was substituted for intermediate layer coating liquid (1). Intermediate layer coating liquids (22) to (25) were prepared by mixing inorganic materials A and B and carbon black C in intermediate layer coating liquid (1) at ratios shown in Table 6.

TABLE 6

| | Intermediate Layer Coating Liquid | A:B:C (weight ratio) |
|---|---|---|
| Comparative Example 3 | (22) | 100:0:18 [= 118] |
| Comparative Example 4 | (23) | 75:25:18 [= 118] |
| Comparative Example 5 | (24) | 0:100:18 [= 118] |
| Comparative Example 6 | (25) | 109:9:0 [= 118] |

Comparative Examples 7 and 8

Floppy disks were obtained in the same manner as with Example 1, with the exception that intermediate layer coating liquids (26) and (27) each was substituted for intermediate layer coating liquid (1). Intermediate layer coating liquids (26) and (27) were prepared by using the same amount of inorganic materials shown in Table 7 in place of inorganic material B in intermediate layer coating liquid (1).

TABLE 7

| | Intermediate Layer Coating Liquid | Kind | Average Particle Size (nm) | BET (m²/g) | Mohs' Hardness |
|---|---|---|---|---|---|
| Comparative Example 7 | (26) | α-alumina | 600 | 4 | 9 |
| | (AKP 20 manufactured by Sumitomo Chemical Co., Ltd.) | | | | |
| Comparative Example 8 | (27) | carbon black | 350 | 8 | — |
| | (SEVACARB MT manufactured by Colombian Carbon Co.) | | | | |

Comparative Examples 9 and 10

Floppy disks were obtained in the same manner as with Example 1, with the exception that intermediate layer coating liquids (28) and (29) each was substituted for intermediate layer coating liquid (1). Intermediate layer coating liquids (28) and (29) were prepared by using the same amount of inorganic materials shown in Table 8 in place of inorganic material A in intermediate layer coating liquid (1).

TABLE 8

| | Intermediate Layer Coating Liquid | Kind | Average Particle Size (nm) | BET (m²/g) | Mohs' Hardness |
|---|---|---|---|---|---|
| Comparative Example 9 | (28) | granular α-iron oxide | 100 | 11 | 6 |
| | (TF-100 manufactured by Toda Kogyo Corp.) | | | | |
| Comparative Example 10 | (29) | needle α-iron oxide | major axial size: 150 minor axial size: 23 | 53 | 6 |
| | (DPN 250 BX manufactured by Toda Kogyo Corp.) | | | | |

Comparative Example 11

| Intermediate Layer Coating Liquid (30) | |
|---|---|
| Carbon black C | 100 parts by weight |
| Average particle size: 24 nm | |
| BET: 125 m²/g | |
| DBP oil absorption: 53 cc/100 g | |
| pH: 8.0 | |
| (#45B manufactured by Mitsubishi Chemical Corporation) | |
| Electron beam sensitive vinyl chloride resin [NV 30%] Vinyl chloride-epoxy-containing monomer copolymer | 233 parts by weight |
| Electron beam sensitive polyurethane resin [NV 40%] Phosphorus group and hydroxy group containing polyester polyurethane | 75 parts by weight |
| Methyl ethyl ketone | 145 parts by weight |
| Toluene | 15 parts by weight |
| Cyclohexanone | 130 parts by weight |
| | (698 parts by weight |

The components described above were dispersed in a sand grinder mill. Then, the following components were added thereto, followed by further dispersion to prepare an intermediate layer coating liquid.

| Butyl stearate | 1 part by weight |
|---|---|
| Sorbitan monostearate | 3 parts by weight |
| Neopentyl glycol dioleate | 8 parts by weight |
| Methyl ethyl ketone | 70 parts by weight |
| Toluene | 7 parts by weight |
| Cyclohexanone | 63 parts by weight |
| | (850 parts by weight) |

A Floppy disk was obtained in the same manner as with Example 1 with the exception that this intermediate layer coating liquid (30) was substituted for intermediate layer coating liquid (1).

Comparative Examples 12 to 15

Floppy disks were obtained in the same manner as with Example 1, with the exception that intermediate layer coating liquids (31) to (34) each was substituted for intermediate layer coating liquid (1). Intermediate layer coating liquids (31) to (34) were prepared by using carbon black shown in Table 9 in place of carbon black in intermediate layer coating liquid (1).

TABLE 9

| | Intermediate Layer Coating Liquid | Average Particle Size (nm) | BET (m²/g) | DBP Oil Absorption (cc/100 g) | pH |
|---|---|---|---|---|---|
| Comparative Example 12 | (31) | 40 | 56 | 115 | 8.0 |
| | (#20B manufactured by Mitsubishi Chemical Corporation) | | | | |
| Comparative Example 13 | (32) | 26 | 130 | 110 | 7.0 |
| | (#3150B manufactured by Mitsubishi Chemical Corporation) | | | | |
| Comparative Example 14 | (33) | 13 | 360 | 70 | 6.5 |
| | (#2600B manufactured by Mitsubishi Chemical Corporation) | | | | |

TABLE 9-continued

|  | Intermediate Layer Coating Liquid | Average Particle Size (nm) | BET (m²/g) | DBP Oil Absorption (cc/100 g) | pH |
|---|---|---|---|---|---|
| Comparative Example 15 | (34) | 20 | 220 | 115 | 7.0 |

(SC manufactured by Colombian Carbon Co.)

Comparative Example 16

Using intermediate layer coating liquid (16) and magnetic coating liquid (a), the crosslinking agent was added to each liquid, immediately before coating, in the same manner as described above. Then, the amount of a diluting solvent was controlled to adjust the apparent viscosity at a shear rate of 200/second measured by the constant flow measuring method using a cone plate type viscometer to the range of 80 to 1.50 cps, for both the intermediate layer coating liquid and the magnetic coating liquid. Intermediate layer coating liquid (16) was then applied to one surface of a 62-μm thick biaxial oriented PET film, both surfaces of which were subjected to treatment for enhancing adhesion, and magnetic coating liquid (a) was applied thereto while the intermediate layer was still in a wet state, followed by random orientation and drying to form a magnetic layer. Then, calendering was conducted thereto. The back surface of the film was treated similarly. Thus, the magnetic layer having a thickness of 0.3 μm and the intermediate layer having a thickness of 1.5 μm were formed on both the surfaces of the film. The resulting product was stamped out to a doughnut-like form having a diameter of 3.5 inches, and allowed to stand at 60° C. for 24 hours to obtain a floppy disk.

A list of the intermediate layer coating liquids prepared in Examples and Comparative Examples is shown in Table 10, and results of evaluation of the floppy disks produced are shown in Tables 11 and 12.

TABLE 10

| | | | | | | | | | | | | | | |
|---|---|---|---|---|---|---|---|---|---|---|---|---|---|---|
| | \multicolumn{14}{c}{Intermediate layer} |
| | \multicolumn{2}{c}{granular oxide:A} | \multicolumn{2}{c}{oxide:B} | \multicolumn{4}{c}{carbon black(CB):C} | | \multicolumn{4}{c}{binder} | |
| | DM | BET | | DM | DM | BET | DBP | | \multicolumn{3}{c}{ratio by weight} | harden- | | |
| | nm | m²/g | | nm | nm | m²/g | cc/100 g | pH | A | B | C | ing | P/B | |
| (1) gr-αFeO | 30 | 35 | alumina | 200 | 24 | 125 | 110 | 8.0 | 92 | 8 | 18 | E. B | 5 | CB:#40B alumina:HIT50 |
| (2) gr-αFeO | 30 | 35 | alumina | 200 | 24 | 125 | 110 | 8.0 | 99 | 1 | 18 | E. B | 5 | nanolite/alumina ratio |
| (3) gr-αFeO | 30 | 35 | alumina | 200 | 24 | 125 | 100 | 8.0 | 97 | 3 | 18 | E. B | 5 | nanolite/alumina ratio |
| (4) gr-αFeO | 30 | 35 | alumina | 200 | 24 | 125 | 110 | 8.0 | 95 | 5 | 18 | E. B | 5 | nanolite/alumina ratio |
| (5) gr-αFeO | 30 | 35 | alumina | 200 | 24 | 125 | 110 | 8.0 | 88 | 12 | 18 | E. B | 5 | nanolite/alumina ratio |
| (6) gr-αFeO | 30 | 35 | alumina | 200 | 24 | 125 | 110 | 8.0 | 85 | 15 | 18 | E. B | 5 | nanolite/alumina ratio |
| (7) gr-αFeO | 30 | 35 | alumina | 200 | 24 | 125 | 110 | 8.0 | 80 | 20 | 18 | E. B | 5 | nanolite/alumina ratio |
| (8) gr-αFeO | 30 | 35 | alumina | 200 | 24 | 125 | 110 | 8.0 | 92 | 8 | 18 | E. B | 5 | alumina separate dispersion |
| (9) gr-αFeO | 30 | 35 | alumina | 200 | 22 | 134 | 100 | 3.4 | 92 | 8 | 18 | E. B | 5 | CB:MA100B |
| (10) gr-αFeO | 30 | 35 | alumina | 200 | 30 | 85 | 113 | 8.0 | 92 | 8 | 18 | E. B | 5 | CB:#30B |
| (11) gr-αFeO | 30 | 35 | alumina | 200 | 16 | 250 | 71 | 8.0 | 92 | 8 | 18 | E. B | 5 | CB:#960B |
| (12) gr-αFeO | 30 | 35 | alumina | 200 | 15 | 260 | 47 | 8.0 | 92 | 8 | 18 | E. B | 5 | CB:#2300B |
| (13) gr-αFeO | 30 | 35 | alumina | 200 | 18 | 200 | 50 | 8.0 | 92 | 8 | 18 | E. B | 5 | CB:MCF88 |
| (14) gr-αFeO | 30 | 35 | alumina | 200 | 24 | 125 | 53 | 8.0 | 92 | 8 | 45 | E. B | 5 | CB:#45B |
| (15) gr-αFeO | 30 | 35 | alumina | 200 | 30 | 70 | 50 | 7.0 | 92 | 8 | 45 | E. B | 5 | CB:RAVEN-760B |
| (16) gr-αFeO | 30 | 35 | alumina | 200 | 24 | 125 | 110 | 8.0 | 88 | 12 | 18 | haet | 5 | thermosetting resin +#40B |
| (17) gr-αFeO | 30 | 35 | alumina | 120 | 24 | 125 | 110 | 8.0 | 92 | 8 | 18 | E. B | 5 | alumina:HIT80 |
| (18) gr-αFeO | 30 | 35 | Cr-oxide | 30 | 24 | 125 | 110 | 8.0 | 92 | 8 | 18 | E. B | 5 | Cr-oxide:U-1 |
| (19) gr-αFeO | 30 | 35 | Si-oxide | 150 | 24 | 125 | 110 | 8.0 | 92 | 8 | 18 | E. B | 5 | Si-oxide:MSC-20 |
| (20) TiO₂ | 35 | 40 | alumina | 200 | 24 | 125 | 110 | 8.0 | 92 | 8 | 18 | E. B | 5 | Ti-oxide:TTO-55B |
| (21) Ba sulfate | 30 | — | alumina | 200 | 24 | 125 | 110 | 8.0 | 92 | 8 | 18 | E. B | 5 | Ba sulfate:BF20 |
| (22) gr-αFeO | 30 | 35 | alumina | 200 | 24 | 125 | 110 | 8.0 | 100 | 0 | 18 | E. B | 5 | no alumina |
| (23) gr-αFeO | 30 | 35 | alumina | 200 | 24 | 125 | 110 | 8.0 | 75 | 25 | 18 | E. B | 5 | nanolite/alumina ratio |
| (24) gr-αFeO | 30 | 35 | alumina | 200 | 24 | 125 | 110 | 8.0 | 0 | 100 | 18 | E. B | 5 | nanolite/alumina ratio |
| (25) gr-αFeO | 30 | 35 | alumina | 200 | 24 | 125 | 110 | 8.0 | 109 | 9 | 0 | E. B | 5 | no carbon |
| (26) gr-αFeO | 30 | 35 | alumina | 570 | 24 | 125 | 110 | 8.0 | 92 | 8 | 18 | E. B | 5 | alumina:AKP20 |
| (27) gr-αFeO | 30 | 35 | carbon | 300 | 24 | 125 | 110 | 8.0 | 92 | 8 | 18 | E. B | 5 | alumina→MTcarbon |
| (28) gr-αFeO | 100 | 11 | alumina | 200 | 24 | 125 | 110 | 8.0 | 92 | 8 | 18 | E. B | 5 | nanolite→TF-100 |
| (29) ne-αFeO | 200 | 50 | alumina | 200 | 24 | 125 | 110 | 8.0 | 92 | 8 | 18 | E. B | 5 | nanolite→DPN250BX (needle) |
| (30) — | — | — | — | — | 24 | 125 | 53 | 8.0 | — | — | 100 | E. B | 2 | CB simple substance (#45B) |
| (31) gr-αFeO | 30 | 35 | alumina | 200 | 40 | 56 | 115 | 8.0 | 92 | 8 | 18 | E. B | 5 | CB:#20B |
| (32) gr-αFeO | 30 | 35 | alumina | 200 | 26 | 130 | 110 | 7.0 | 92 | 8 | 13 | E. B | 5 | CB:#3150B |
| (33) gr-αFeO | 30 | 35 | alumina | 200 | 13 | 360 | 70 | 6.5 | 92 | 8 | 13 | E. B | 5 | CB:#2600B |
| (34) gr-αFeO | 30 | 35 | alumina | 200 | 20 | 220 | 115 | 7.0 | 92 | 8 | 13 | E. B | 5 | CB:SC | gr-αFeO: granular α-iron oxide; ne-αFeO: needle α-iron oxide; E. B: electron beam

TABLE 11

| | | Physical characteristics | | | | | | | | | |
|---|---|---|---|---|---|---|---|---|---|---|---|
| | | Non-magnetic intermediate layer | | | | | mag. layer | | layers of coating | | |
| Ex. | C.C | thick µm | Ra nm | Rz nm | Fini- shing | hard- ening | abr. sec | C.C | thick µm | Ra nm | Rz nm | Ω/sq |
| 1 | (1) | 1.5 | 10.0 | 67.1 | no | yes | 30 | a | 0.30 | 4.2 | 32.6 | 5E + 7 |
| 2 | (1) | 1.5 | 10.0 | 67.1 | no | no | 20 | a | 0.30 | 5.0 | 42.2 | 3E + 7 |
| 3 | (1) | 1.5 | 5.2 | 48.3 | yes | yes | 30 | a | 0.30 | 3.3 | 28.6 | 5E + 7 |
| 4 | (1) | 1.5 | 5.2 | 48.3 | yes | no | 20 | a | 0.30 | 4.5 | 33.1 | 2E + 7 |
| 5 | (1) | 0.8 | 9.9 | 68.1 | no | yes | 25 | a | 0.30 | 5.9 | 46.6 | 6E + 8 |
| 6 | (2) | 1.5 | 8.9 | 60.8 | no | yes | 20 | a | 0.30 | 3.3 | 24.6 | 5E + 7 |
| 7 | (3) | 1.5 | 9.0 | 63.1 | no | yes | 20 | a | 0.30 | 3.3 | 25.8 | 5E + 7 |
| 8 | (4) | 1.5 | 9.5 | 65.4 | no | yes | 25 | a | 0.30 | 3.5 | 27.6 | 5E + 7 |
| 9 | (5) | 1.5 | 10.7 | 73.7 | no | yes | 30 | a | 0.30 | 4.8 | 38.2 | 3E + 7 |
| 10 | (6) | 1.5 | 11.2 | 74.0 | no | yes | 35 | a | 0.30 | 5.3 | 45.0 | 3E + 7 |
| 11 | (7) | 1.5 | 11.8 | 76.6 | no | yes | 35 | a | 0.30 | 5.9 | 46.0 | 4E + 7 |
| 12 | (8) | 1.5 | 9.5 | 60.2 | no | yes | 30 | a | 0.30 | 3.9 | 30.5 | 5E + 7 |
| 13 | (9) | 1.5 | 9.9 | 67.5 | no | yes | 30 | a | 0.30 | 4.0 | 33.4 | 2E + 8 |
| 14 | (10) | 1.5 | 9.8 | 65.8 | no | yes | 30 | a | 0.30 | 3.9 | 32.5 | 5E + 7 |
| 15 | (11) | 1.5 | 9.8 | 68.1 | no | yes | 30 | a | 0.30 | 3.9 | 34.4 | 5E + 7 |
| 16 | (12) | 1.5 | 9.8 | 68.1 | no | yes | 30 | a | 0.30 | 4.0 | 33.3 | 2E + 8 |
| 17 | (13) | 1.5 | 9.7 | 67.5 | no | yes | 30 | a | 0.30 | 3.8 | 34.5 | 2E + 8 |
| 18 | (14) | 1.5 | 10.8 | 78.7 | no | yes | 30 | a | 0.30 | 4.0 | 36.8 | 8E + 7 |
| 19 | (15) | 1.5 | 9.9 | 70.1 | no | yes | 30 | a | 0.30 | 3.9 | 36.0 | 8E + 7 |
| 20 | (16) | 1.5 | 10.1 | 60.8 | no | yes | 30 | a | 0.30 | 4.2 | 32.3 | 5E + 7 |
| 21 | (17) | 1.5 | 9.5 | 67.2 | no | yes | 30 | a | 0.30 | 3.9 | 33.9 | 5E + 7 |
| 22 | (18) | 1.5 | 10.8 | 70.4 | no | yes | 35 | a | 0.30 | 4.3 | 37.8 | 5E + 7 |
| 23 | (19) | 1.5 | 11.0 | 76.1 | no | yes | 35 | a | 0.30 | 4.4 | 39.0 | 5E + 7 |
| 24 | (20) | 1.5 | 11.1 | 75.5 | no | yes | 25 | a | 0.30 | 4.0 | 36.1 | 5E + 7 |
| 25 | (21) | 1.5 | 11.1 | 76.0 | no | yes | 25 | a | 0.30 | 4.2 | 38.3 | 5E + 7 |

| | | | | electromagnetic characteristics | | | |
|---|---|---|---|---|---|---|---|
| | magnetic char. | | | Tr:000 | Tr:239 | Tr:000 | |
| Ex. | Hc Oe | Br G | OR | 10 kFCl % | 35 kFCl RES % | MOD % | coat- ing |
| 1 | 1540 | 2100 | 1.01 | 90 | 130 | 123 | 2.5 | W.D. |
| 2 | 1540 | 2100 | 1.02 | 87 | 125 | 118 | 3.0 | W.D. |
| 3 | 1540 | 2100 | 1.00 | 90 | 135 | 125 | 2.0 | W.D. |
| 4 | 1540 | 2100 | 1.02 | 88 | 128 | 120 | 2.8 | W.D. |
| 5 | 1540 | 2100 | 1.00 | 87 | 126 | 118 | 3.0 | W.D. |
| 6 | 1540 | 2100 | 1.00 | 85 | 124 | 120 | 3.2 | W.D. |
| 7 | 1540 | 2100 | 1.00 | 90 | 135 | 125 | 2.1 | W.D. |
| 8 | 1540 | 2100 | 1.00 | 90 | 133 | 124 | 2.4 | W.D. |
| 9 | 1540 | 2100 | 1.01 | 88 | 127 | 120 | 2.7 | W.D. |
| 10 | 1540 | 2100 | 1.01 | 87 | 125 | 120 | 2.9 | W.D. |
| 11 | 1540 | 2100 | 1.01 | 85 | 124 | 120 | 3.3 | W.D. |
| 12 | 1540 | 2100 | 1.01 | 89 | 132 | 125 | 2.4 | W.D. |
| 13 | 1540 | 2100 | 1.00 | 89 | 130 | 123 | 2.6 | W.D. |
| 14 | 1540 | 2100 | 1.01 | 89 | 128 | 121 | 2.8 | W.D. |
| 15 | 1540 | 2100 | 1.00 | 90 | 132 | 123 | 2.2 | W.D. |
| 16 | 1540 | 2100 | 1.00 | 89 | 129 | 121 | 2.3 | W.D. |
| 17 | 1540 | 2100 | 1.00 | 90 | 130 | 124 | 2.2 | W.D. |
| 18 | 1540 | 2100 | 1.00 | 89 | 131 | 122 | 2.3 | W.D. |
| 19 | 1540 | 2100 | 1.00 | 89 | 130 | 122 | 2.3 | W.D. |
| 20 | 1540 | 2100 | 1.01 | 89 | 129 | 122 | 2.6 | W.D. |
| 21 | 1540 | 2100 | 1.01 | 90 | 130 | 124 | 2.3 | W.D. |
| 22 | 1540 | 2100 | 1.01 | 89 | 125 | 120 | 3.0 | W.D. |
| 23 | 1540 | 2100 | 1.01 | 88 | 122 | 120 | 2.9 | W.D. |
| 24 | 1540 | 2100 | 1.01 | 91 | 130 | 123 | 2.4 | W.D. |
| 25 | 1540 | 2100 | 1.00 | 90 | 128 | 122 | 2.8 | W.D. |

TABLE 12

| Co. Ex. | Non-magnetic intermediate layer | | | | | | | mag. layer | | layers of coating | | | |
|---|---|---|---|---|---|---|---|---|---|---|---|---|---|
| | C.C | thick μm | Ra nm | Rz nm | Processing | hardening | grind sec | C.C | thick μm | Ra nm | Rz nm | Ω/sq |
| 1 | — | — | — | — | — | — | — | a | 0.30 | 8.7 | 70.4 | 1E11 |
| 2 | — | — | — | — | — | — | — | a | 2.0 | 5.6 | 50.2 | 5E10 |
| 3 | (22) | 1.5 | 8.7 | 55.8 | no | yes | 10 | a | 0.30 | 3.3 | 23.6 | 5E + 7 |
| 4 | (23) | 1.5 | 13.8 | 86.6 | no | yes | 35 | a | 0.30 | 8.5 | 67.1 | 5E + 7 |
| 5 | (24) | 1.5 | 23.0 | 122.1 | no | yes | 40 | a | 0.30 | 10.3 | 73.6 | 5E + 7 |
| 6 | (25) | 1.5 | 9.3 | 59.2 | no | yes | 30 | a | 0.30 | 4.0 | 46.1 | 1E12 |
| 7 | (26) | 1.5 | 13.6 | 98.8 | no | yes | 40 | a | 0.30 | 8.0 | 60.2 | 5E + 7 |
| 8 | (27) | 1.5 | 11.5 | 81.6 | no | yes | 10 | a | 0.30 | 7.3 | 56.4 | 4E + 7 |
| 9 | (28) | 1.5 | 13.6 | 88.2 | no | yes | 20 | a | 0.30 | 6.4 | 54.3 | 6E + 7 |
| 10 | (29) | 1.5 | 14.5 | 95.0 | no | yes | 20 | a | 0.30 | 6.4 | 52.7 | 2E + 7 |
| 11 | (30) | 1.5 | 14.2 | 94.2 | no | yes | 5 | a | 0.30 | 7.2 | 59.8 | 5E + 7 |
| 12 | (31) | 1.5 | 15.3 | 96.2 | no | yes | 30 | a | 0.30 | 7.9 | 59.5 | 8E + 7 |
| 13 | (32) | 1.5 | 18.4 | 103.1 | no | yes | 30 | a | 0.30 | 8.4 | 62.2 | 2E + 7 |
| 14 | (33) | 1.5 | 19.8 | 104.6 | no | yes | 30 | a | 0.30 | 8.2 | 60.9 | 5E + 7 |
| 15 | (34) | 1.5 | 18.9 | 102.7 | no | yes | 30 | a | 0.30 | 7.9 | 60.2 | 2E + 7 |
| 16 | (35) | 1.5 | — | — | — | — | — | a | 0.30 | 3.8 | 29.7 | 5E + 7 |

| Co. Ex. | magnetic char. | | | electromagnetic characteristics | | | | |
|---|---|---|---|---|---|---|---|---|
| | | | | Tr:000 | Tr:239 | Tr:239 | Tr:000 | |
| | Hc Oe | Br G | OR | 10 kFCl % | 35 kFCl % | RES % | MOD % | coating |
| 1 | 1540 | 2100 | 1.00 | 80 | 105 | 103 | 14.1 | W.D. |
| 2 | 1540 | 2100 | 1.00 | 123 | 110 | 94 | 2.4 | W.D. |
| 3 | 1540 | 2100 | 1.00 | 85 | 118 | 114 | 16.6 | W.D. DO |
| 4 | 1540 | 2100 | 1.01 | 83 | 113 | 110 | 4.2 | W.D. |
| 5 | 1540 | 2100 | 1.01 | 80 | 110 | 110 | 9.2 | W.D. |
| 6 | 1540 | 2100 | 1.00 | 88 | 120 | 117 | 8.3 | W.D. DO |
| 7 | 1540 | 2100 | 1.01 | 83 | 115 | 110 | 10.2 | W.D. |
| 8 | 1540 | 2100 | 1.01 | 84 | 116 | 112 | 9.1 | W.D. |
| 9 | 1540 | 2100 | 1.00 | 85 | 116 | 110 | 5.9 | W.D. |
| 10 | 1540 | 2100 | 1.00 | 85 | 117 | 113 | 5.6 | W.D. |
| 11 | 1540 | 2100 | 1.01 | 87 | 115 | 111 | 20.3 | W.D. DO |
| 12 | 1540 | 2100 | 1.01 | 86 | 114 | 112 | 9.5 | W.D. |
| 13 | 1540 | 2100 | 1.01 | 87 | 110 | 109 | 11.2 | W.D. |
| 14 | 1540 | 2100 | 1.01 | 87 | 112 | 111 | 9.8 | W.D. |
| 15 | 1540 | 2100 | 1.01 | 87 | 110 | 110 | 9.8 | W.D. |
| 16 | 1540 | 2100 | 1.00 | 89 | 130 | 120 | 5.2 | W.W |

Ex.: Examples;
C.C.: composition of coating;
thick: thickness;
W.D.: wet-on-dry(one-by-one) coating;
Co. Ex.: Comparative Examples
DO: lots of dropouts;
W.W: wet-on-wet coating As is apparent from Tables 11 and 12, the magnetic recording media of the present invention having the intermediate layer comprising specific A, B and C components at specific ratios are sufficient in smoothness, strength and conductivity of the intermediate layer, superior to the conventional magnetic recording media in electromagnetic characteristics, and particularly good in the shorter wavelength region (35 kFCI) due to the surface roughness. Further, the coating system in which the intermediate layer and the magnetic layer are sequentially formed after drying reduces fluctuations in MOD, compared with the wet-on-wet system in which the magnetic layer is formed on the intermediate layer still in a wet state. The comparison between Example 20 and Comparative Example 16 shows that the system of the present invention is equal to or better than the wet coating system also in surface properties which are poor in the conventional magnetic recording media.

According to the present invention, the magnetic recording media having the intermediate layer excellent in conductivity, surface properties and strength, and excellent in electromagnetic characteristics, physical properties, etc., particularly the high density magnetic recording media can be obtained.

What is claimed is:

1. A magnetic recording medium comprising a non-magnetic support, a non-magnetic intermediate layer having a thickness of 0.5 μm to 3.0 μm formed on at least one surface of said support, and a magnetic layer formed on said intermediate layer, said magnetic layer being composed mainly of a ferromagnetic powder and a binder and having a thickness of 0.1 μm to 0.5 μm, and is formed on said intermediate layer wherein said intermediate layer must be in a dry state, and said intermediate layer comprises:

(A) an inorganic material having an average particle size of 10 nm to 50 nm and a Mohs' hardness of 7 or less, (B) an inorganic material having an average particle size of 100 nm to 500 nm and a Mohs' hardness of 9 or more, (C) carbon black, a lubricant and a binder;

wherein when the parts by weight of the inorganic material (A) is taken as {A}, the parts by weight of the inorganic material (B) is taken as {B}, and the parts by weight of carbon black (C) is taken as {C}, the following equations are satisfied:

{A}:{B}=99:1–80:20

{C}/({A}+{B})=10–50% by weight; and the carbon black (C) contained in the intermediate layer has an average particle size of 10 nm to 30 nm and a specific surface area by the B.E.T. method (BET) of 70 $m^2/g$ to 300 $m^2/g$, and the dibutyl-phthalate (DBP) oil absorption (cc/100 g) and BET ($m^2/g$) satisfy the following relationship:

45<DBP oil absorption <140–(0.233 x BET).

2. The magnetic recording medium according to claim 1 in which the inorganic material (A) contained in the intermediate layer is one member selected from the group consisting of granular α-iron oxide and granular titanium oxide, and the inorganic material (B) is one member selected from the group consisting of alumina and chromium oxide.

* * * * *